(12) United States Patent
Masuda

(10) Patent No.: US 12,300,437 B2
(45) Date of Patent: May 13, 2025

(54) CERAMIC ELECTRONIC DEVICE AND MANUFACTURING METHOD OF THE SAME

(71) Applicant: TAIYO YUDEN CO., LTD., Tokyo (JP)

(72) Inventor: Hidetoshi Masuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 140 days.

(21) Appl. No.: 18/180,036

(22) Filed: Mar. 7, 2023

(65) Prior Publication Data

US 2023/0298820 A1    Sep. 21, 2023

(30) Foreign Application Priority Data

Mar. 15, 2022   (JP) ................. 2022-040534

(51) Int. Cl.
*H01G 4/12*   (2006.01)
*H01G 4/008*   (2006.01)
*H01G 4/30*   (2006.01)

(52) U.S. Cl.
CPC ........... *H01G 4/1227* (2013.01); *H01G 4/008* (2013.01); *H01G 4/30* (2013.01)

(58) Field of Classification Search
CPC ......... H01G 4/1227; H01G 4/008; H01G 4/30
See application file for complete search history.

(56) References Cited

U.S. PATENT DOCUMENTS

| | | | | |
|---|---|---|---|---|
| 2001/0055193 | A1* | 12/2001 | Chazono | H01G 4/1209 361/311 |
| 2013/0222968 | A1* | 8/2013 | Koga | H01G 4/1227 501/137 |
| 2015/0274597 | A1* | 10/2015 | Morigasaki | C04B 35/638 428/697 |
| 2016/0268045 | A1* | 9/2016 | Kaneko | H01G 4/30 |
| 2017/0025222 | A1* | 1/2017 | Park | H01G 4/1209 |
| 2019/0066920 | A1* | 2/2019 | Kim | C04B 35/4682 |
| 2020/0411241 | A1 | 12/2020 | Hashimoto et al. | |
| 2022/0130608 | A1* | 4/2022 | Mizuno | H01G 4/30 |

FOREIGN PATENT DOCUMENTS

JP     2021009993 A    1/2021

* cited by examiner

*Primary Examiner* — Michael P McFadden
(74) *Attorney, Agent, or Firm* — Law Office of Katsuhiro Arai

(57) ABSTRACT

A ceramic electronic device includes a multilayer chip in which dielectric layers and internal electrode layers are alternately stacked. The internal electrode layers include a main component element and a sub-element. The dielectric layers include a plurality of crystal grains. A segregation portion, in which the sub-element is segregated in shell portions and a grain boundary of the plurality of crystal grains and a sub-element concentration is 1.5 times or more as that in an entire of each of the dielectric layers, is formed. near an interface between each of the internal electrode layers and each of the dielectric layers, each of the internal electrode layers has a high concentration layer, in which the sub-element concentration is 1.5 times or more as that in an entire of each of the internal electrode layers.

10 Claims, 11 Drawing Sheets

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2022-040534, filed on Mar. 15, 2022, the entire contents of which are incorporated herein by reference.

FIELD

A certain aspect of the present invention relates to a ceramic electronic device and a manufacturing method of the ceramic electronic device.

BACKGROUND

With the miniaturization of electronic devices, there is a demand for further miniaturization of ceramic electronic devices such as multilayer ceramic capacitors mounted on electronic devices. In order to increase the capacity value, which is a basic characteristic, one of the following is required: (1) increase the dielectric constant of a dielectric layer, (2) increase the capacity defining area, or (3) decrease the thickness of the dielectric layer. When the dielectric constant and the device size are predetermined, the thinner the dielectric layer is, the larger the capacity value per layer is. Since the number can be increased when the thickness of the dielectric layer and the thickness of the internal electrode layer are reduced, it is advantageous for increasing the capacity.

SUMMARY OF THE INVENTION

According to an aspect of the present invention, there is provided a ceramic electronic device including: a multilayer chip in which each of dielectric layers including barium titanate and each of internal electrode layers are alternately stacked, wherein the internal electrode layers include a main component element and a sub-element of which an amount is smaller than that of the main component element, wherein the dielectric layers include a plurality of crystal grains, wherein a segregation portion, in which the sub-element is segregated in shell portions and a grain boundary of the plurality of crystal grains and a sub-element concentration is 1.5 times or more as that in an entire of each of the dielectric layers, is formed, and wherein, near an interface between each of the internal electrode layers and each of the dielectric layers, each of the internal electrode layers has a high concentration layer, in which the sub-element concentration is 1.5 times or more as that in an entire of each of the internal electrode layers.

According to another aspect of the present invention, there is provided a manufacturing method of a ceramic electronic device including: forming stack units by forming an internal electrode pattern on each of dielectric green sheets including barium titanate, the internal electrode pattern including a main component element and a sub-element of which an amount is smaller than an amount of the main component element; oxidizing a surface of the internal electrode pattern by an oxygen plasma; forming a multilayer structure by stacking the stack units; and firing the multilayer structure.

DETAILED DESCRIPTION

When the dielectric layer becomes thin, the electric field strength applied to the dielectric layer increases, which may reduce the insulation reliability. In ceramic electronic devices, the insulating properties of the devices are often ensured by sub-elements segregating in the grain boundaries and shells of the dielectric. For example, if sub-elements are mixed in the dielectric slurry, the distribution of the sub-elements tends to become non-uniform. A leak path may be generated at the site where the sub-element is excessive, weakening the insulation. At the site where the sub-element is deficient, the resistance of the grain boundary and the shell cannot be sufficiently increased, and the desired insulating state may not be necessarily obtained. Since the sites of excess and deficiency occur randomly, it is difficult to uniformly disperse the sub-elements.

A description will be given of an embodiment with reference to the accompanying drawings.

First Embodiment

Figure 1:
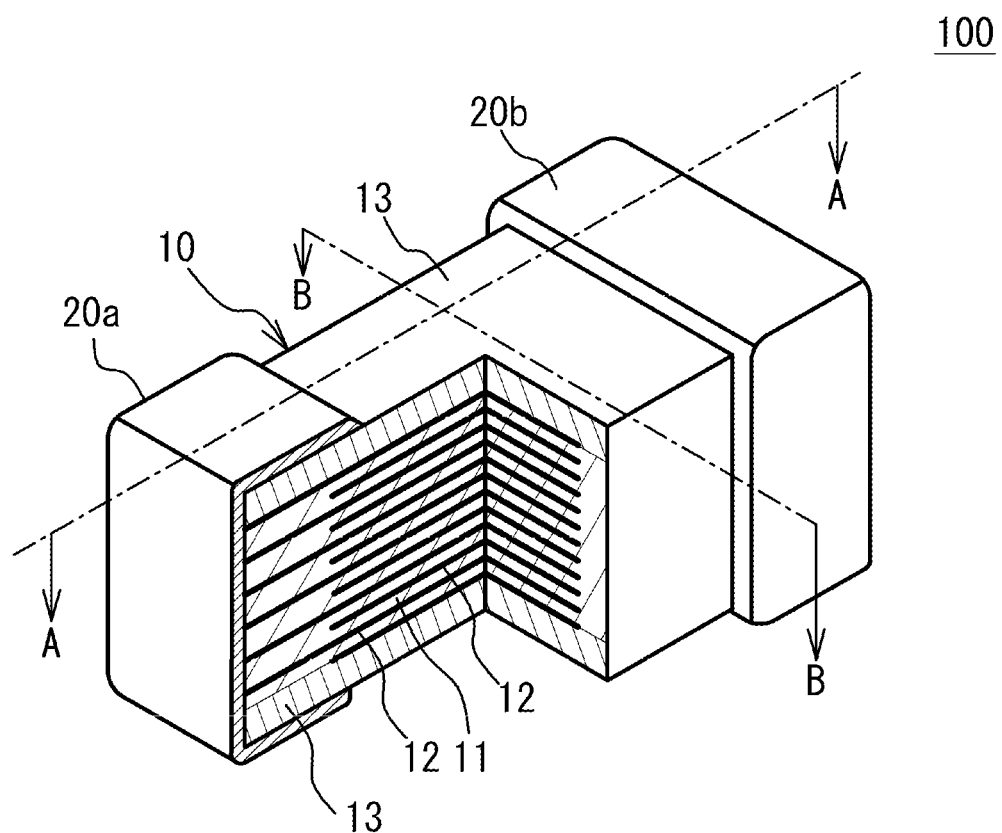
FIG. 1 illustrates a perspective view of a multilayer ceramic capacitor in which a cross section of a part of the multilayer ceramic capacitor is illustrated.
Figure 2:
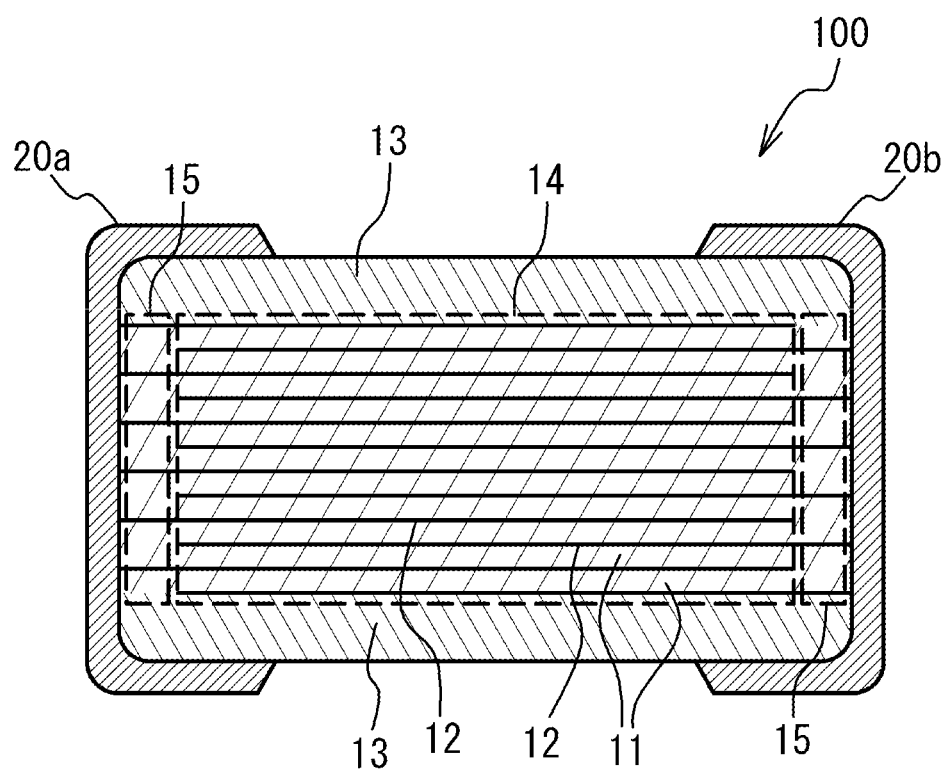
FIG. 2 illustrates a cross sectional view taken along a line A-A of FIG. 1.
Figure 3:
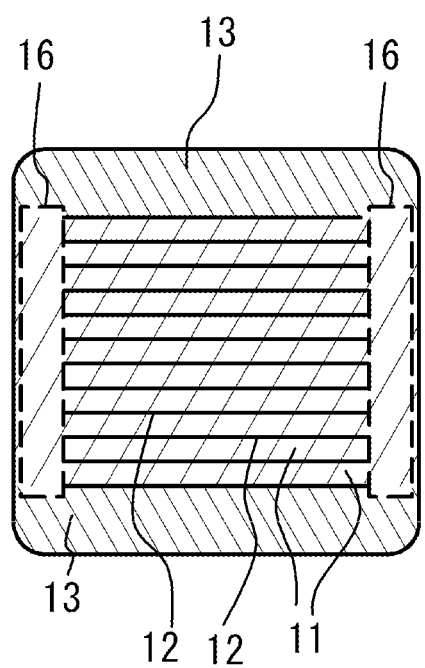
FIG. 3 illustrates a cross sectional view taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a multilayer structure and cover layers 13. The multilayer structure includes a multilayer portion designed to have dielectric layers 11 and internal electrode layers 12 alternately stacked. The dielectric layer 11 includes ceramic material acting as a dielectric material. The internal electrode layers 12 include a base metal material. The multilayer chip 10 has a substantially rectangular parallelepiped shape. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by the cover layers 13. A main component of the cover layer 13 is a ceramic material. For example, a main component of the cover layer 13 may be the same as that of the dielectric layer 11 or may be different from that of the dielectric layer 11. The structure of the multilayer ceramic capacitor 100 is not limited to FIG. 1 to FIG. 3 if the internal electrode layers are respectively exposed to two different faces and are respectively connected to two different external electrodes.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layers 12 are mainly composed of base metals such as Ni (nickel), Cu (copper), Sn (tin). A noble metal such as Pt (platinum), Pd (palladium), Ag (silver), Au (gold), or an alloy containing these metals may be used as the main component element of the internal electrode layer 12. In the internal electrode layer 12, the concentration of the main component element is approximately 90 at % to 99.99 at %. The internal electrode layers 12 contain sub-elements in addition to the main component elements. The sub-elements are not particularly limited. The sub-element may be Ag, As (arsenic), Au, Co (cobalt), Cr (chromium), Cu, Fe (iron), In (indium), Ir (iridium), Mg (magnesium), Mo (molybdenum), Os (osmium), Pd, Pt, Re (rhenium), Rh (rhodium), Ru (ruthenium), Se (selenium), Sn, Te (tellurium), W (tungsten), Y (yttrium), Zn (zinc), and Ge (germanium). The sub-element exists in the internal electrode layers 12 and also diffuse into the dielectric layers 11, exhibiting the effect of increasing the insulating properties of the multilayer ceramic capacitor 100. Among these sub-elements, Au, Co, Cr, Fe, In, Mg, Sn, Y, and Zn exhibit a large effect of increasing insulation. The thickness of the internal electrode layer 12 is, for example, 10 nm or more and 1000 nm or less, 20 nm or more and 500 nm or less, or 50 nm or more and 300 nm or less. The thickness of the internal electrode layer 12 is determined by observing the cross section of the multilayer ceramic capacitor 100 with an SEM, measuring the thickness of 10 different internal electrode layers 12 at 10 points each, and deriving the average value of all the measurement points.

The main phase of the dielectric layer 11 is, for example, a ceramic material having a perovskite structure represented by the general formula $ABO_3$. The perovskite structure contains $ABO_{3-\alpha}$ outside the stoichiometric composition. For example, a material containing Ba and Ti and having a perovskite structure can be used as the ceramic material. For example, $BaTiO_3$ (barium titanate), $Ba_{1-x-y}Ca_xSr_yTi_{1-z}Zr_zO_3$ ($0 \leq x \leq 1$, $0 \leq y \leq 1$, $0 \leq z \leq 1$) forming a perovskite structure, and the like can be used.

In the present embodiment, for example, the thickness of each of the dielectric layers 11 is 0.05 μm or more and 5 μm or less, or 0.1 μm or more and 3 μm or less, or 0.2 μm or more and 1 μm or less. The thickness of the dielectric layer 11 is obtained by observing the cross section of the multilayer ceramic capacitor 100 with an SEM (scanning electron microscope), measuring the thickness of 10 different dielectric layers 11 at 10 points each, and calculating the average value of all the measurement points.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges in the Y-axis direction of the stacked internal electrode layers 12 in the extension direction toward the two side faces. The side margin 16 does not generate electrical capacity. The capacity section 14 and the side margin 16 act as the multilayer structure of the multilayer chip 10.

The dielectric layer 11 contains a plurality of crystal grains. At least some of the crystal grains are core-shell grains 30 having a core-shell structure.

Figure 4A:
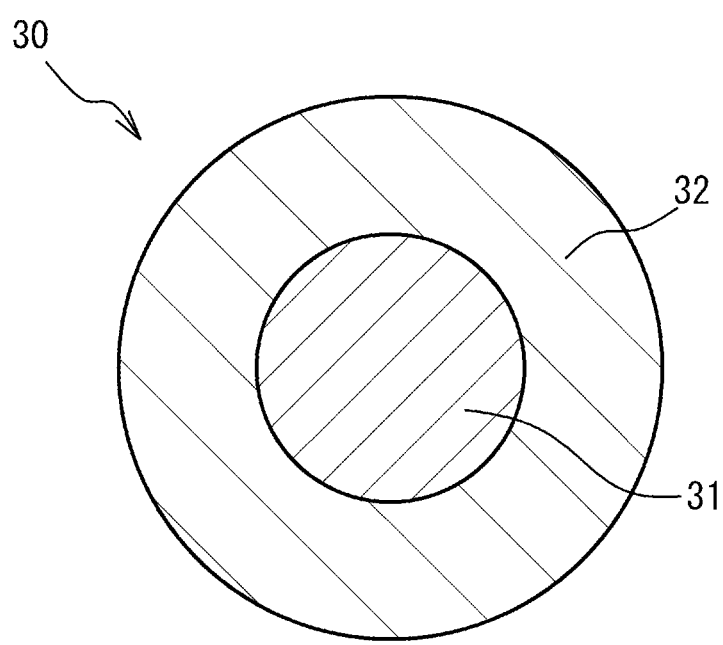
FIG. 4A illustrates a core-shell grain.

As illustrated in FIG. 4A, the core-shell grain 30 includes a substantially spherical core portion 31 and a shell portion 32 that surrounds and covers the core portion 31. The core portion 31 is a crystal portion in which an additive element is not solid-solved or the amount of the additive element in solid-solution is small. The shell portion 32 is a crystal portion in which the additive element is solid-solved and has a concentration of the additive element higher than that of the core portion 31. For example, the core portion 31 is made of barium titanate, and the shell portion 32 is mainly made of barium titanate and has a structure in which the additive element is solid-solved in barium titanate. The additive element also includes the sub-element diffused from the internal electrode layers 12. Note that the core portion 31 tends to have a lower electrical resistance and a higher dielectric constant than the shell portion 32. The shell portion 32 tends to have higher electrical resistance and a lower dielectric constant than the core portion 31. The insulating properties of the dielectric layer 11 tend to be dominated by the shell portion 32 rather than the core portion 31.

Figure 4B:
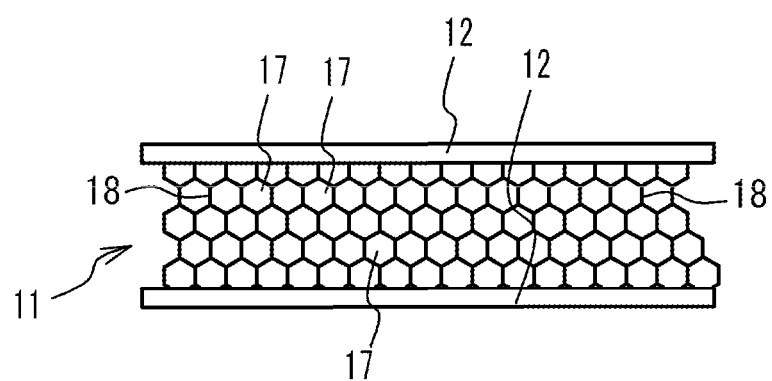
FIG. 4B illustrates a schematic cross section of a dielectric layer.

FIG. 4B is a schematic cross-sectional view of the dielectric layer 11. As exemplified in FIG. 4B, the dielectric layer 11 includes the plurality of crystal grains 17 of the main component ceramic. At least some of the crystal grains 17 are the core-shell grains 30 described in FIG. 4A. Crystal grain boundaries 18 are formed between the crystal grains 17.

Figure 4C:
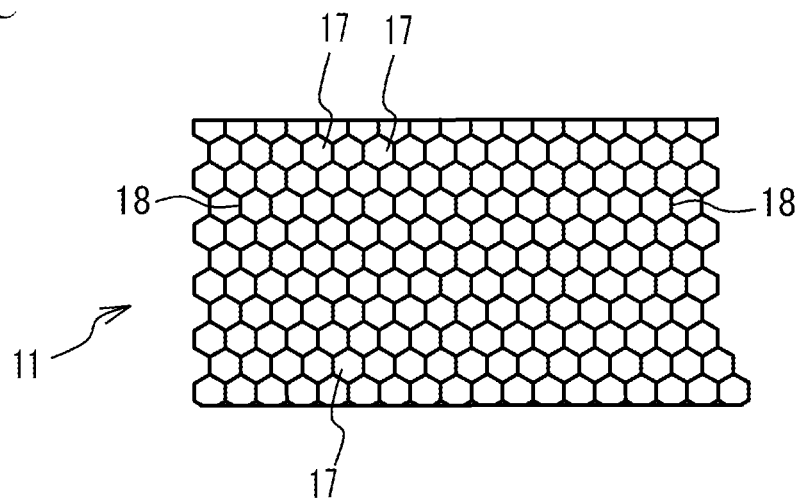
FIG. 4C illustrates a schematic plan view of a dielectric layer.

FIG. 4C is a schematic plan view of the dielectric layer 11. As illustrated in FIG. 4C, the dielectric layer 11 has the crystal grains 17 even in a plan view. At least some of the crystal grains 17 are the core-shell grains 30 described in FIG. 4A. The crystal grain boundaries 18 are formed between the crystal grains 17.

The sub-element of the internal electrode layer 12 are segregated at the grain boundaries 18 and the shell portions 32. Specifically, a segregation portion of the sub-element appears. The segregation portion can be defined as a portion where the sub-element concentration is 1.5 times or more as the sub-element concentration in the entire dielectric layer 11. The segregation part may appear on the entire grain boundary 18 or may appear on a part thereof.

Figure 5A:
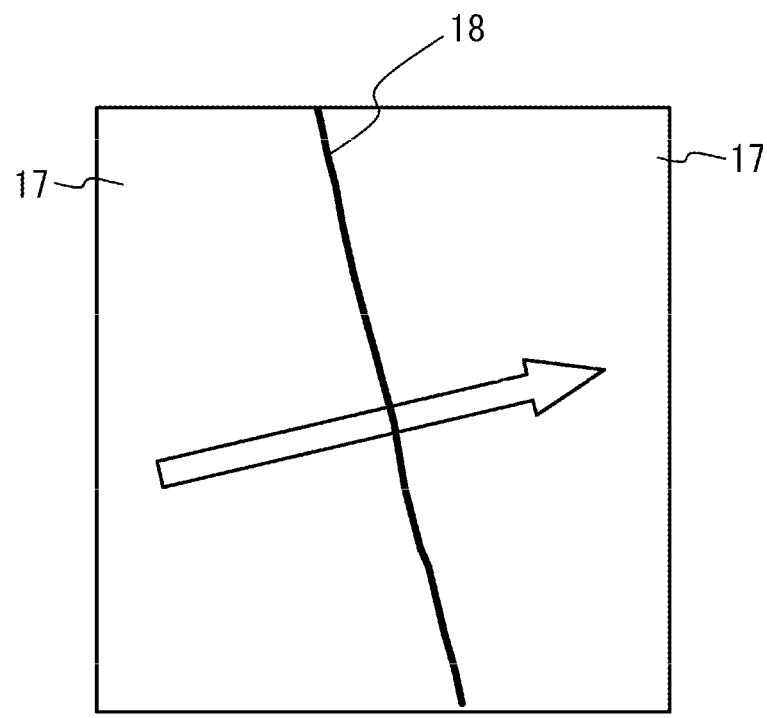
FIG. 5A shows STEM-EDS line analysis in a vicinity of a crystal grain boundary between crystal grains.

FIG. 5A shows STEM (scanning transmission electron microscope)-EDS (energy dispersive X-ray spectroscopy) line analysis in the vicinity of the crystal grain boundary 18 between the crystal grain 17 and the adjacent crystal grain 17. As an example, the main component of the dielectric layers 11 is barium titanate, the main component element of the internal electrode layers 12 is Ni, and the sub-element added to the internal electrode layers 12 is Fe.

Figure 5B:
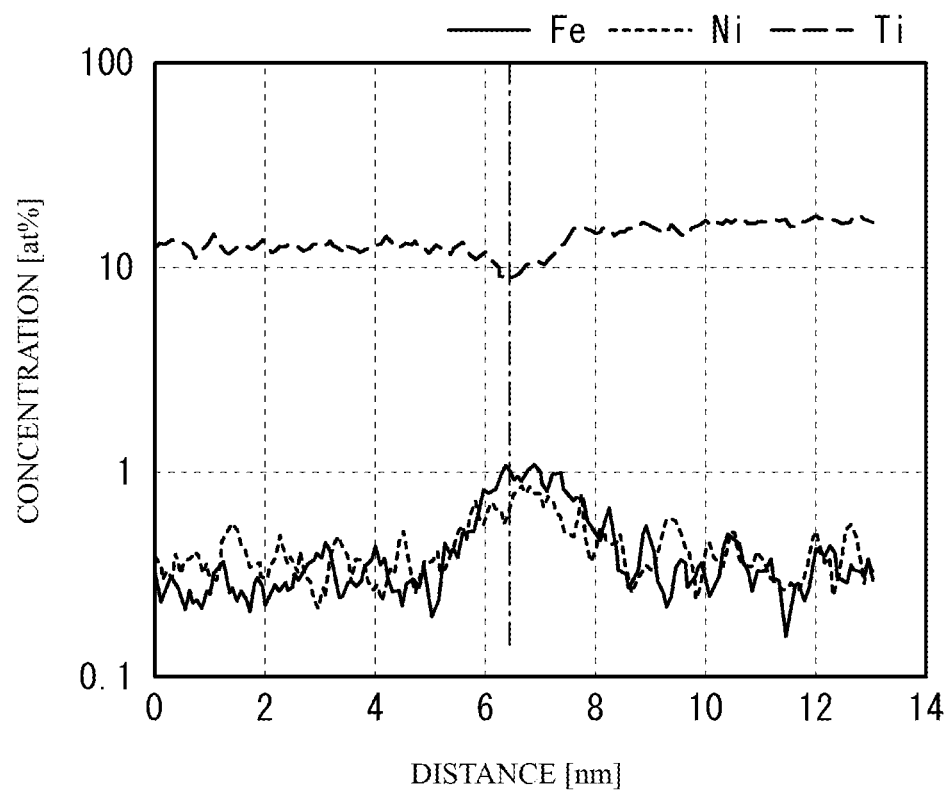
FIG. 5B illustrates a result of STEM-EDS line analysis.

FIG. 5B shows the results of STEM-EDS line analysis. A dashed-dotted line represents the grain boundary 18. As illustrated in FIG. 5B, inside the crystal grain 17, the Fe concentration and the Ni concentration are low and substantially constant. Near the grain boundary 18, a peak appears in the Fe concentration and the Ni concentration. In this manner, the main component element and the sub-element of the internal electrode layer 12 tend to segregate in the grain boundaries 18. These concentration peaks have a predetermined width. Therefore, it is considered that the main component element and the sub-element of the internal electrode layers 12 are also segregated in the shell portions 32 of the core-shell grains 30.

In the multilayer ceramic capacitor 100, the thinner the dielectric layer 11 is, the larger the capacity value per dielectric layer 11 is. Since it is possible to increase the size in the predetermined thickness by reducing the thickness of the dielectric layer 11, it is advantageous for increasing the capacity.

However, when the dielectric layer 11 becomes thin, the electric field strength applied to the dielectric layer 11 increases, which may reduce the insulation reliability. In the multilayer ceramic capacitor 100, the insulating properties of the multilayer chip 10 are often ensured by the sub-elements that diffuse from the internal electrode layers 12 and segregate in the grain boundaries 18 and the shell portions 32 of the dielectric layers 11. If the sub-element is simply mixed in the dielectric slurry before firing as in the conventional method, the sub-element is likely to be unevenly dispersed. For example, since it is difficult to reduce the grain size of the sub-element to be added to 1 nm to several tens of nanometers, if the mixing method is insufficient, the abundance of the sub-element will be concentrated in a specific location. That is, there is a possibility that lumps of the sub-element having a grain size of at least several tens of nanometers may remain locally in the dielectric layer 11, or the amount of the sub-element may be locally insufficient. In this case, a leak path may be generated at the site where the sub-element is excessive, weakening the insulation. In the portion where the sub-element is insufficient, the resistance between the crystal grain boundary 18 and the shell portion 32 cannot be sufficiently increased, and the desired insulating state may not be necessarily obtained. It was difficult to obtain the desired insulating state because the positions of the sites where the sub-elements were excessive or deficient occurred at random.

Therefore, the multilayer ceramic capacitor 100 according to the present embodiment has a structure capable of improving the insulation reliability because the sub-element can be diffused at the atomic level.

Figure 6A:
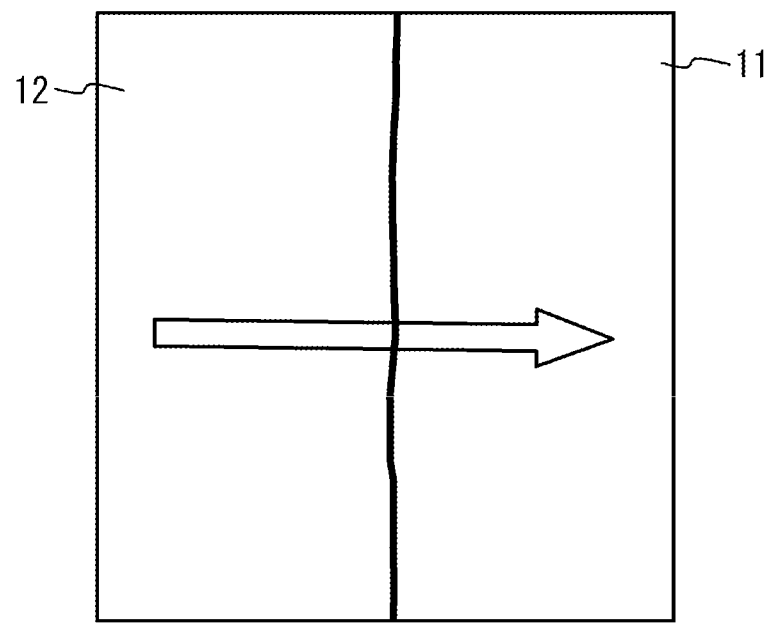
FIG. 6A shows STEM-EDS line analysis in a vicinity of an interface between a dielectric layer and an internal electrode layer.

FIG. 6A is a diagram showing the positions where the STEM-EDS line analysis was performed. As shown in FIG. 6A, the line analysis was performed from the dielectric layer 11 toward the internal electrode layer 12 near the interface between the dielectric layer 11 and the internal electrode layer 12. In FIG. 6A, the portion indicated by the thick black line corresponds to the interface. In this case, for example, the main component of the dielectric layers 11 is barium titanate, the main component element of the internal electrode layers 12 is Ni, and the sub-element added to the internal electrode layers 12 is Fe.

Figure 6B:
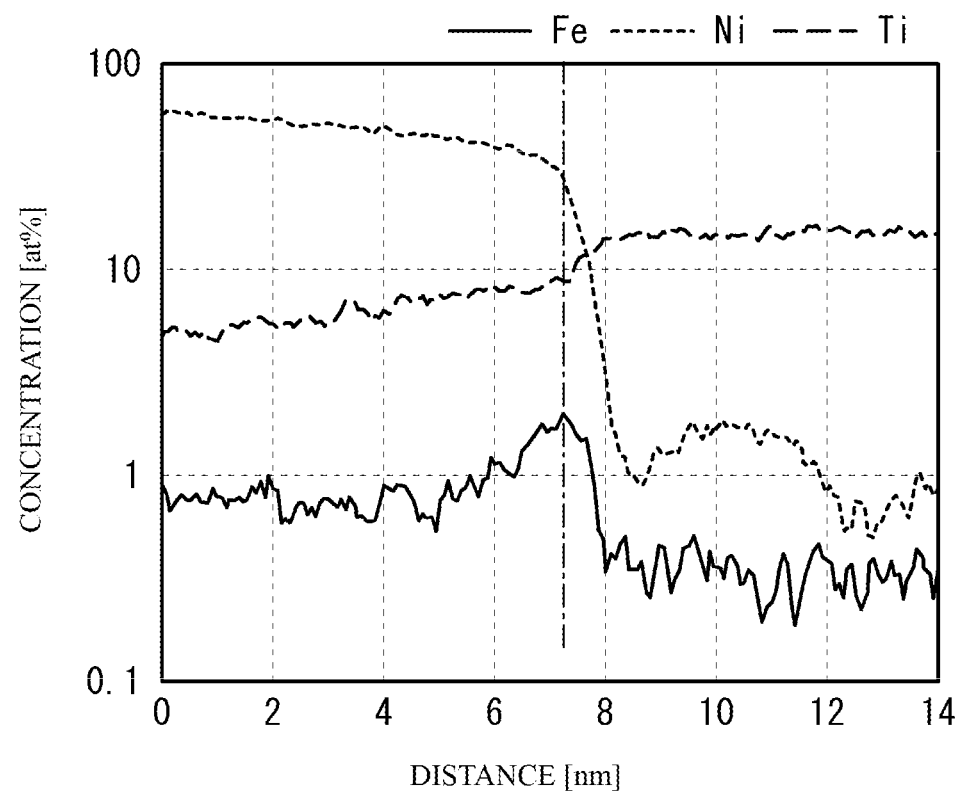
FIG. 6B illustrates a result of STEM-EDS line analysis.

FIG. 6B shows the results of STEM-EDS line analysis. A dashed-dotted line represents the interface between the dielectric layer 11 and the internal electrode layer 12. As shown in FIG. 6B, inside the internal electrode layer 12, the Ni concentration is substantially constant at a high value, and the Fe concentration is substantially constant at a low value. A peak appears in the Fe concentration when approaching the interface between the dielectric layer 11 and the internal electrode layer 12. Thus, the internal electrode layer 12 includes a high concentration layer 121 containing the sub-element at high concentration near the interface with the dielectric layer 11. The high concentration layer 121 is a layer in which the sub-element concentration is 1.5 times or more as the sub-element concentration in the entire internal electrode layer 12. The concentration of the sub-element is the atomic concentration of the sub-element with respect to the sum of the main component element and the sub-element in the internal electrode layer 12.

Figure 7:
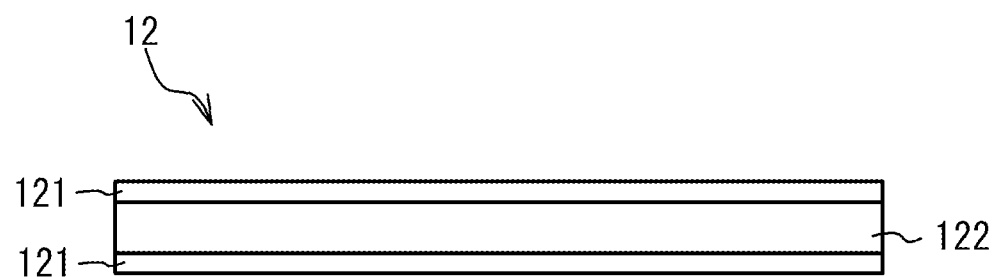
FIG. 7 illustrates a high concentration layer and a low concentration layer in an internal electrode layer.

As illustrated in FIG. 7, the internal electrode layer 12 includes the high concentration layer 121 near the interface with the dielectric layer 11 (a predetermined thickness range from the surface of the internal electrode layer 12). A low concentration layer 122 having a lower sub-element concentration is provided between two high concentration layers 121 in the thickness direction.

Figure 8:
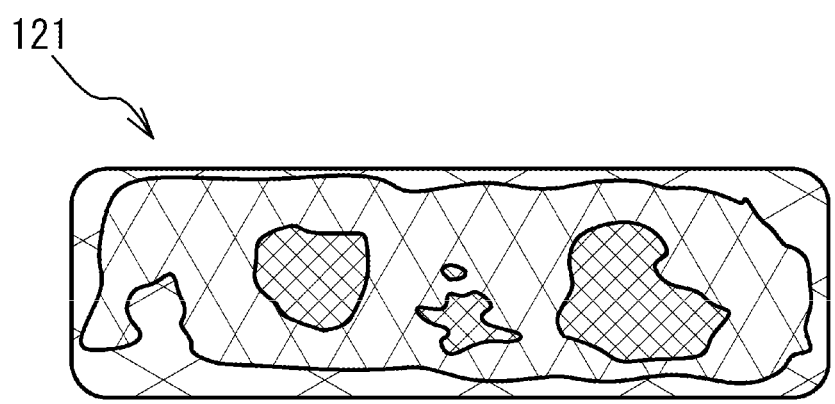
FIG. 8 is a plan view of a high concentration layer, in which a concentrations of a sub-element is drawn in shades of patterns.

FIG. 8 is a plan view of the high concentration layer 121, in which the concentration of the sub-element is drawn in shades of patterns. The darker the pattern is, the higher the concentration of the sub-element is. And the lighter the pattern is, the lower the concentration of the sub-element is. As illustrated in FIG. 8, although there is a distribution in the sub-element concentration, the difference in the sub-element concentration is small as a whole. Specifically, the variation range of the sub-element concentration at each position in the entire high concentration layer 121 when viewed in plan (the variation range of the sub-element concentration in the direction in which the internal electrode layers 12 extend) is 30% or less of the average concentration of the sub-element in the whole of the high concentration layer 121. That is, when the average concentration of the sub-element is AC, the concentration of the sub-element at each position is AC±30%.

The sub-element concentration at each position of the high concentration layer 121 is the average value of the sub-element concentrations in the thickness direction of the high concentration layer 121 at each position. Each position is, for example, each position separated by an interval of 1 µm.

The fluctuation range of the sub-element concentration at each position in the entire high concentration layer 121 when viewed from above is 30% or less of the average concentration of the sub-element in the entire high concentration layer 121, so that the sub-element concentration as a whole is can be reduced, and the sub-elements are distributed substantially uniformly. According to this configuration, the sub-element is supplied substantially uniformly from the internal electrode layers 12 to the dielectric layers 11, so that the sub-element are supplied substantially uniformly in the planar direction of the dielectric layers 11. Since the sub-element diffuses through the crystal grain boundary 18, the sub-element is efficiently supplied to the crystal grain boundary 18 and the shell portion 32. Since relatively high-speed grain boundary diffusion can be used, the uniformity of the sub-element concentration in the thickness direction can be ensured simply by adjusting the firing conditions. Since the high concentration layer 121 functions as a buffer for the sub-element, excess or deficiency of supply to the dielectric layer 11 is automatically adjusted.

As described above, the distribution of the sub-element in the dielectric layer 11 is made uniform, thereby suppressing the occurrence of local leak paths caused by excessive sub-elements. In addition, since the generation of the sub-element deficient portion is suppressed, a desired insulating state can be obtained. Therefore, the insulation reliability of the dielectric layer 11 can be improved.

From the viewpoint of uniforming the distribution of the sub-element concentration in the high concentration layer 121, the variation range of the sub-element concentration at each position in the entire high concentration layer 121 in a planar view is preferably 30% or less of the average of the sub-element concentration in the entire high concentration layer 121, more preferably 20% or less.

In order to supply the sub-element to the dielectric layer 11 substantially uniformly, it is preferable that the sub-element concentration in the low concentration layer 122 is also substantially uniform. For example, the variation range of the sub-element concentration at each position in the entire low concentration layer 122 in a planar view (the variation range of the sub-element concentration in the direction in which the internal electrode layer 12 extends) is preferably 30% or less of the average concentration of the element in the entire low concentration layer 122, more preferably 20% or less, and even more preferably 10% or less.

From the viewpoint of distributing the sub-element concentration substantially uniformly in the dielectric layer 11, the variation range of the sub-element concentration at each position in the entire dielectric layer 11 in a planar view (the sub-element concentration in the extending direction of the dielectric layer 11) is preferably 30% or less of the average concentration of sub-elements in the entire dielectric layer 11, more preferably 20% or less, and even more preferably 10% or less. The sub-element concentration at each position of the dielectric layer 11 is the average value of the sub-element concentration in the thickness direction of the dielectric layer 11 at each position. The sub-element concentration can be calculated as the atomic concentration of the sub-element with respect to all elements including the sub-element. Each position is, for example, each position separated by an interval of 1 µm.

The average concentration of the sub-element in the entire internal electrode layer 12 is preferably higher than the average concentration of the sub-element in the entire dielectric layer 11. This is because the sub-element can be efficiently supplied from the internal electrode layer 12 to the dielectric layer 11.

It is preferable that the sub-element concentration is higher in the order of the high concentration layer 121, the segregation portion, the low concentration layer 122, and the region other than the segregation portion in the dielectric layer 11. This is because the supply of the sub-element from the internal electrode layers 12 to the dielectric layers 11 can be efficiently advanced, and a sufficient amount of the sub-element can be supplied to the segregation portion that contributes to insulation.

The difference between the sub-element concentration of the high concentration layer 121, the sub-element concentration of the segregation portion, the sub-element concentration of the low concentration layer 122, and the sub-element concentration of the region other than the segregation portion in the dielectric layer 11 is 0.1 at % or more and 2 at % or less. This is because if the difference is too small, the effect will be insufficient, and if the difference is too large, the concentration balance will be unstable.

If the dielectric layer 11 is formed thick, the sub-element may not sufficiently diffuse from the internal electrode layer 12 to the central portion of the dielectric layer 11, and the insulating properties of the dielectric layer 11 as a whole may not be sufficiently improved. Therefore, when the dielectric layer 11 is formed thin, the effect of the present embodiment is exhibited remarkably. For example, when the thickness of the dielectric layer 11 is 1 µm or less, the effect of the present embodiment is exhibited remarkably.

In addition, the side margin 16 has a larger distance from the internal electrode layer 12, so the volume ratio of the segregation portion is smaller than that of the capacity section 14. Also, since the number of the internal electrode layers 12 is reduced in the end margin 15, the volume ratio of the segregation portion is also smaller in the end margins 15 than in the capacity section 14.

Figure 9:
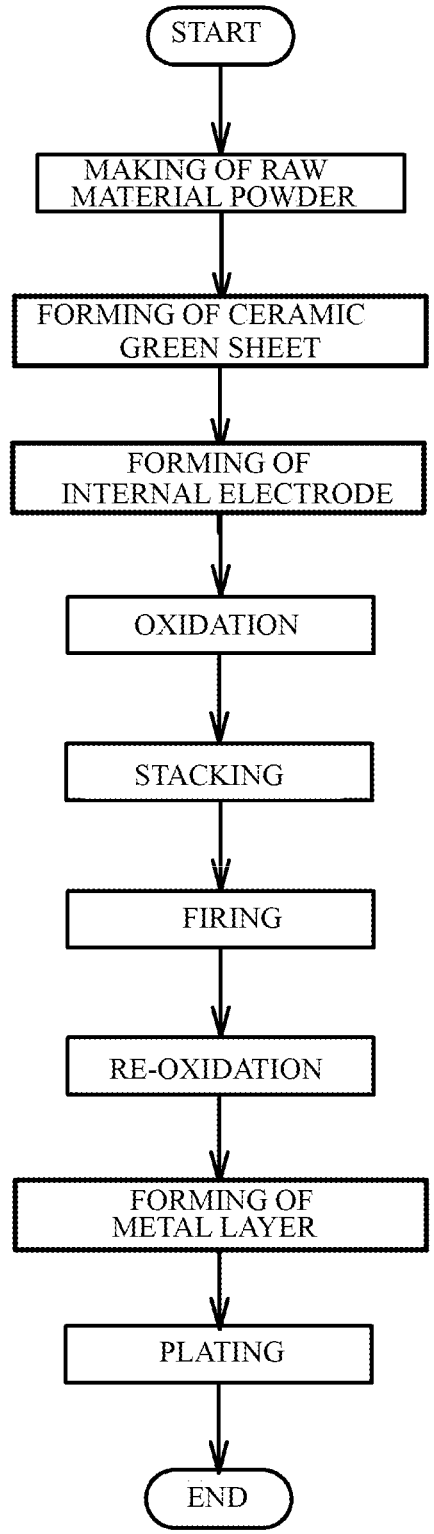
FIG. 9 illustrates a manufacturing method of a multilayer ceramic capacitor.

Next, a description will be given of a manufacturing method of the multilayer ceramic capacitors 100. FIG. 9 illustrates a manufacturing method of the multilayer ceramic capacitor 100.

(Making process of raw material powder) Material powders for forming the dielectric layer 11, the cover layer 13 and the side margin 16 are prepared. The A-site element and the B-site element contained in the dielectric layer 11, the cover layer 13 and the side margin 16 are usually contained in the form of sintered particles of $ABO_3$. For example, barium titanate is a tetragonal compound having a perovskite structure and exhibits a high dielectric constant. This barium titanate can generally be obtained by reacting a titanium raw material such as titanium dioxide with a barium raw material such as barium carbonate to synthesize barium titanate. Various methods can be used as a synthesizing method of the main component ceramic of the dielectric layer 11, the cover layer 13 and the side margin 16. For example, a solid-phase method, a sol-gel method, a hydrothermal method or the like can be used. The embodiments may use any of these methods.

A predetermined additive element is added to the obtained ceramic powder according to the purpose. The additive compound may be an oxide of Mg (magnesium), Mn (manganese), V (vanadium), Cr, rare earth elements (Y, Sm (samarium), Eu (europium), Gd (gadolinium), Tb (terbium), Dy (dysprosium),), Ho (holmium), Er (erbium), Tm (thulium) and Yb (ytterbium)), or and oxide including Co, Ni, Li (lithium), B (boron), Na (sodium) K (, potassium) or Si (silicon), or a glass containing Co, Ni, Li, B, Na, K or Si.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the particle diameter of the resulting ceramic power may be adjusted by combining the crushing and classifying. With the processes, a dielectric material is obtained.

(Forming process of dielectric green sheet) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is formed on a base material 51 by, for example, a die coater method or a doctor blade method, and then dried. The base material 51 is, for example, PET (polyethylene terephthalate) film.

Figure 10A:
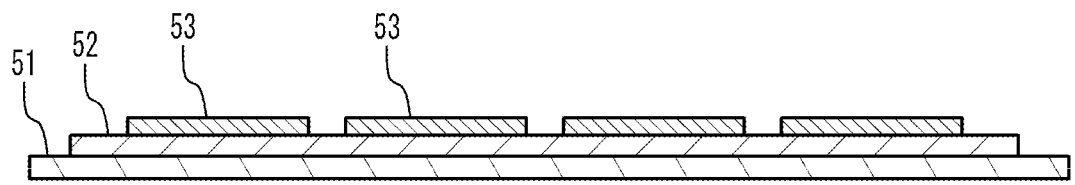
FIG. 10A to FIG. 10C illustrate a stacking process.

(Printing process) Next, as illustrated in FIG. 10A, an internal electrode pattern 53 is formed on the dielectric green sheet 52. The internal electrode pattern 53 includes the main component element and the sub-element of the internal electrode layer 12. The main component element and the sub-element are contained in the internal electrode pattern 53 in the shape of powder. In FIG. 10A, as an example, four parts of the internal electrode pattern 53 are formed on the dielectric green sheet 52 and are spaced from each other. The dielectric green sheet 52 on which the internal electrode pattern 53 is formed is a stack unit.

Figure 10B:
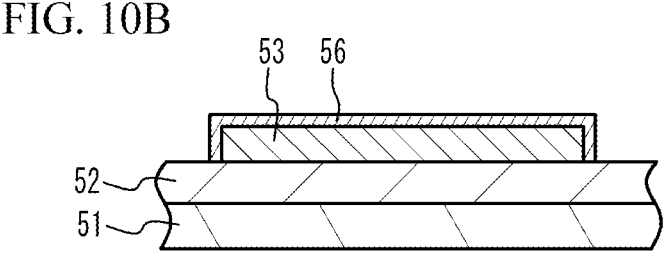

(Oxidation process) Next, the outermost surface of the internal electrode pattern 53 is oxidized with oxygen plasma to form an oxide film 56. The outermost surface is a region with a thickness of 1 nm or less from the surface, as illustrated in FIG. 10B. As a result, the main component element and the sub-element of the internal electrode layer 12 are oxidized to become metal oxides on the outermost surface. It should be noted that it is difficult to uniformly oxidize the entire outermost surface only by exposing the internal electrode pattern 53 to the atmosphere.

In the oxidation treatment with oxygen plasma, if the energy of the plasma is too high or the treatment time is too long, the oxidation progresses from the outermost surface to the inside, making it difficult for current to flow through the internal electrode layers 12 after firing. Therefore, it is preferable to set appropriate processing conditions to avoid oxidation of the electrodes.

Figure 10C:
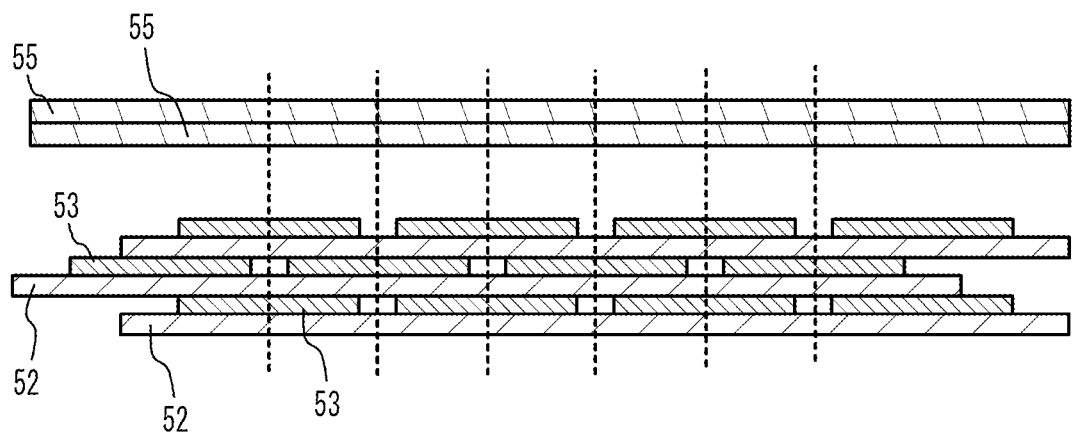

(Staking process) Next, the dielectric green sheets 52 are peeled from the base materials 51. As illustrated in FIG. 10C, the stack units are stacked.

Next, a predetermined number of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 10C, the multilayer structure is cut along a dotted line. Similar to the dielectric green sheet 52, the cover sheet 54 is made by adding a binder such as polyvinyl butyral (PVB) resin, an organic solvent such as ethanol or toluene, and a plasticizer to the raw material powder produced in the raw material powder making process, wet-mixing, using the obtained slurry, forming the slurry on the base material 51 by a die coater method or a doctor blade method, and drying the slurry.

(Firing process) The resulting ceramic multilayer structure thus obtained is subjected to a binder removal treatment in an $N_2$ atmosphere. And then, an external electrode paste, which will be the base layer of the external electrodes 20a and 20b, is applied on the ceramic multilayer structure by a dipping method or the like. The resulting ceramic multilayer structure is fired for 10 minutes to 2 hours in a reductive atmosphere having an oxygen partial pressure of $10^{-5}$ to $10^{-8}$ atn in a temperature range of 1100 degrees C. to 1300 degrees C. Thus, the multilayer ceramic capacitor 100 is obtained.

(Re-oxidizing process) A re-oxidation process may be performed in a $N_2$ atmosphere at 600° C. to 1000° C.

(Plating process) After that, by a plating process, plated layers of Cu, Ni, Sn or the like may be formed on the external electrodes 20a and 20b.

According to the manufacturing method of the multilayer ceramic capacitor 100 according to the present embodiment, the sub-element is supplied to the dielectric layer 11 by thermal diffusion by performing the heat treatment in the firing process. Since the outermost surface of the internal electrode pattern 53 is an oxide film, the sub-element is easily diffused into the dielectric layer 11 having an oxide as a main phase. Therefore, the time lag of the start of diffusion for each position is reduced. Once the diffusion of the sub-element is started, the sub-element that has diffused first serves as priming water, and the following sub-element also tends to diffuse. As a result, the distribution of the sub-element in the dielectric layer 11 is made uniform, thereby suppressing the occurrence of local leak paths due to excessive sub-element. In addition, since the generation of the sub-element deficient portion is suppressed, a desired insulating state can be obtained. Therefore, the insulation reliability of the dielectric layer 11 can be improved.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

Example 1

A dielectric green sheet containing barium titanate as the main component of the ceramic component was prepared, and a conductive paste was printed on the surface of the dielectric green sheet as an internal electrode pattern. An alloy containing 1.0 at % Fe was used instead of pure Ni as the metal powder in the conductive paste. The concentration in this case was at % of Fe/(Fe+Ni). The outermost surface of the internal electrode pattern was oxidized by oxygen plasma, and the inside was not oxidized. A plurality of dielectric green sheets having internal electrode patterns formed thereon were stacked on a previously prepared cover sheet. Subsequently, crimping, cutting, application of a metal paste for an external electrode, and firing were performed to obtain a multilayer ceramic capacitor.

In order to analyze the state of fine crystal grains in the obtained multilayer ceramic capacitor, STEM-EDS analysis was performed on 5 points per sample. After confirming the entire view of the grains in a field of view of about 1 μm, the interface between the dielectric layer and the internal electrode layer and the vicinity of the crystal grain boundary of the dielectric layer were observed at high magnification in a field of view of about 20 nm square.

When checking the STEM-EDS image of the vicinity of the crystal grain boundary of the dielectric layer, it was confirmed that Fe and Ni were segregated at the crystal grain boundary and the vicinity of the grain boundary (shell portion).

Also, when the STEM-EDS image near the interface between the internal electrode layer and the dielectric layer was confirmed, it was confirmed that Fe was segregated at the interface. It was also confirmed that the internal electrode layers contained Fe in regions other than the vicinity of the interface. The variation range of the Fe high concentration layer, which was defined as a high concentration layer in which the concentration of the sub-element in the direction in which the internal electrode layers extend was 1.5 times or more as the concentration in the entire internal electrode layer, was 30% or less with respect to the average concentration of Fe in the high concentration layer. In the internal electrode layers, the variation range of the Fe concentration in the low concentration layers other than the high concentration layers was 30% or less with respect to the average Fe concentration in the low concentration layers.

Example 2

Au was used instead of Fe as the sub-element. Other conditions were the same as in Example 1.

A STEM-EDS analysis was performed in the same manner as in Example 1. When the STEM-EDS image of the vicinity of the crystal grain boundary of the dielectric layer was confirmed, it was confirmed that Au and Ni were segregated at the grain boundary and the vicinity of the grain boundary (shell portion).

Also, when the STEM-EDS image near the interface between the internal electrode layer and the dielectric layer was confirmed, it was confirmed that Au was segregated at the interface. It was also confirmed that the internal electrode layers contained Au in regions other than the vicinity of the interface. The variation range of the Au high concentration layer in the direction in which the internal electrode layers extend was 30% or less with respect to the average concentration of Au in the high concentration layer. In the internal electrode layers, the variation range of the Au concentration in the low concentration layers other than the high concentration layers was 30% or less with respect to the average concentration of Au in the low concentration layers.

Example 3

Cr was used as the sub-element instead of Fe. Other conditions were the same as in Example 1.

A STEM-EDS analysis was performed in the same manner as in Example 1. When the STEM-EDS image of the vicinity of the crystal grain boundary of the dielectric layer was confirmed, it was confirmed that Cr and Ni were segregated at the grain boundary and the vicinity of the grain boundary (shell portion).

Also, when the STEM-EDS image near the interface between the internal electrode layer and the dielectric layer was confirmed, it was confirmed that Cr was segregated at the interface. It was also confirmed that the internal electrode layers contained Cr in regions other than the vicinity of the interface. The variation range of the Cr high concentration layer in the direction in which the internal electrode layers extend was 30% or less with respect to the average Cr concentration in the high concentration layer. In the internal electrode layers, the variation range of the Cr concentration in the low concentration layer other than the high concentration layers was 30% or less with respect to the average Cr concentration in the low concentration layers.

Comparative Example 1

In Comparative Example 1, no sub-element was added to the conductive paste. That is, a pure Ni conductive paste was printed as the internal electrode pattern. Other conditions were the same as in Example 1.

Comparative Example 2

A dielectric green sheet containing barium titanate as the main component of the ceramic component and to which Fe was added was prepared, and a conductive paste was printed on the surface of the dielectric green sheet as the internal electrode pattern. Pure Ni was used for the conductive paste, and no sub-element was added. That is, a pure Ni conductive paste was printed as the internal electrode pattern. The total amount of Fe added to the dielectric green sheet was made equal to that of Example 1. Other conditions were the same as in Example 1.

A STEM-EDS analysis was performed in the same manner as in Example 1. Fe was not detected in the internal electrode layers.

A STEM-EDS image of the vicinity of the interface between the internal electrode layer and the dielectric layer was confirmed. The variation range of the Fe concentration at the interface was about 50% of the average Fe concentration at the entire interface.

Comparative Example 3

In Comparative Example 3, the outermost surface of the internal electrode pattern was not oxidized. Other conditions were the same as in Example 1.

A STEM-EDS analysis was performed in the same manner as in Example 1. When the STEM-EDS image of the vicinity of the interface between the internal electrode layer and the dielectric layer was confirmed, it was confirmed that Fe was segregated at the interface. It was also confirmed that the internal electrode layers contained Fe in regions other than the vicinity of the interface. The variation range of the Fe concentration in the internal electrode layers other than the interface was 30% or less with respect to the average Fe concentration in the internal electrode layers other than the interface. However, the variation range of the Fe concentration at the interface was about 40% of the average Fe concentration at the interface.

A 125 C/18V HALT (Highly Accelerated Limit Test at 125° C., 18 V/μm) was performed for each of Examples 1 to 3 and Comparative Examples 1 to 3. The HALT lifetime (time to failure) was defined as the time until the leak current exceeded 1 mA. If the HALT lifetime was 5 times or more as the HALT lifetime of Comparative Example 1, it was judged to be very good "double circle". If the HALT lifetime was 4 times or more and less than 5 times as the HALT lifetime of Comparative Example 1, it was judged to be good "o". If the HALT lifetime was less than 4 times as the HALT lifetime of Comparative Example 1, it was judged to be bad "x".

Table 1 shows the measurement results. As shown in Table 1, in Comparative Example 2, the HALT lifetime was slightly improved as compared with Comparative Example 1, but the extent of improvement was slight. It is considered that this was because the variation range of the Fe concentration at the interface between the internal electrode layers and the dielectric layers was as large as about 50% of the average Fe concentration at the entire interface. In Comparative Example 3, the HALT lifetime was slightly improved from Comparative Example 1, but the extent of improvement was slight. This was probably because the variation range of the Fe concentration at the interface between the internal electrode layer and the dielectric layer was as large as about 50% of the average Fe concentration at the entire interface.

TABLE 1

| | SUB-ELEMENT | VARIATION OF CONCENTRATION IN HIGH CONCENTRATION LAYER (%) | VARIATION OF CONCENTRATION IN LOW CONCENTRATION LAYER (%) | HALT LIFETIME (min) | JUDGE |
| --- | --- | --- | --- | --- | --- |
| EXAMPLE 1 | Fe | <30 | <30 | 9000 | ⊚ |
| EXAMPLE 2 | Au | <30 | <30 | 8000 | ⊚ |
| EXAMPLE 3 | Cr | <30 | <30 | 7000 | ○ |
| COMPARATIVE EXAMPLE 1 | — | — | — | 1500 | X |
| COMPARATIVE EXAMPLE 2 | Fe | 50 | — | 3000 | X |
| COMPARATIVE EXAMPLE 3 | Fe | 40 | <30 | 4000 | X |

On the other hand, in Examples 1 to 3, the HALT lifetime was significantly improved over that in Comparative Example 1. It is considered that this was because the variation range of the Fe concentration at the interface between the internal electrode layer and the dielectric layer was reduced to 30% or less of the average Fe concentration at the entire interface. Since the HALT lifetime of Examples 1 and 2 was longer than the HALT lifetime of Example 3, it can be seen that it is preferable to use Fe or Au as the sub-element.

Figure 11:
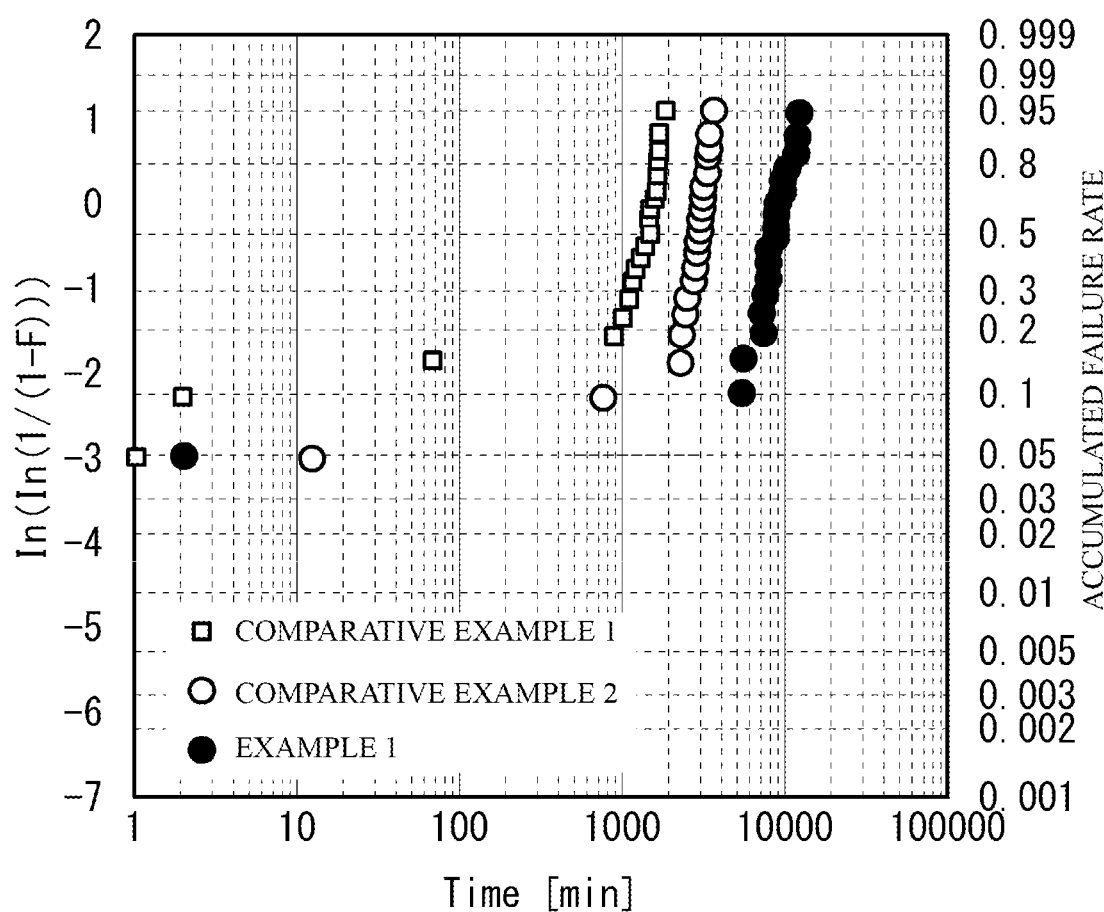
FIG. 11 is a Weibull plot showing the HALT results of Example 1 and Comparative Examples 1 and 2 as accumulated failure rates.

FIG. 11 is a Weibull plot showing the HALT results of Example 1 and Comparative Examples 1 and 2 as accumulated failure rates. The horizontal axis indicates the time until failure. The vertical axis indicates the accumulated failure rate. It was confirmed that the state of Example 1, in which the sub-element was uniformly segregated both in the internal electrode and in the vicinity of the dielectric crystal grain boundary, had the longest life. Comparative Example 2 has the second longest lifetime, but since the supply source of the sub-elements was not the internal electrode, the distribution of the sub-elements was uneven, and the lifetime of the entire dielectric layer could not be uniformly extended. Comparative Example 1 containing no sub-element had the shortest life.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip in which each of dielectric layers including barium titanate and each of internal electrode layers are alternately stacked,
wherein the internal electrode layers include a main component element and a sub-element of which an amount is smaller than that of the main component element,
wherein the dielectric layers include a plurality of crystal grains,
wherein a segregation portion, in which the sub-element is segregated in shell portions and a grain boundary of the plurality of crystal grains and a sub-element concentration is 1.5 times or more as that in an entire of each of the dielectric layers, is formed, and
wherein, near an interface between each of the internal electrode layers and each of the dielectric layers, each of the internal electrode layers has a high concentration layer, in which the sub-element concentration is 1.5 times or more as that in an entire of each of the internal electrode layers.

2. The ceramic electronic device as claimed in claim 1, wherein, in the high concentration layer, a variation range of the sub-element concentration in a direction in which the internal electrode layers extend is 30% or less of an average of the sub-element concentration in an entire of the high concentration layer.

3. The ceramic electronic device as claimed in claim 1, wherein, in a low concentration layer in each of the internal electrode layers other than the high concentration layer, a variation range of the sub-element concentration in a direction in which the internal electrode layers extend, is 30% or less of an average of the sub-element concentration of an entire of the low concentration layer.

4. The ceramic electronic device as claimed in claim 1, wherein, in each of the dielectric layers, a variation range of the sub-element concentration in a direction in which the dielectric layers extend is 30% or less of an average of the sub-element concentration of an entire of each of the dielectric layers.

5. The ceramic electronic device as claimed in claim 1, wherein an average of the sub-element concentration in an entire of each of the internal electrode layer is higher than that in an entire of each of the dielectric layers.

6. The ceramic electronic device as claimed in claim 1, wherein the sub-element concentration is higher in an order of the high concentration layer, the segregation portion, the low concentration layer, and a region other than the segregation portion in each of the dielectric layers.

7. The ceramic electronic device as claimed in claim 1, wherein a difference between the sub-element concentration of the high concentration layer, the sub-element concentration of the segregation portion, the sub-element concentration of the low concentration layer, and the sub-element concentration of a region other than the segregation portion in each of the dielectric layers is 0.1 at % or more and 2 at % or less.

8. The ceramic electronic device as claimed in claim 1,
wherein a thickness of each of the plurality of dielectric layers is 1 μm or less,
wherein a thickness of each of the plurality of internal electrode layers is 1 μm or less.

9. The ceramic electronic device as claimed in claim 1, wherein the main component element of the internal electrode layer is Ni.

10. The ceramic electronic device as claimed in claim 1, wherein the sub-element is at least one of Ag, As, Au, Co, Cr, Cu, Fe, In, Ir, Mg, Mo, Os, Pd, Pt, Re, Rh, Ru, Se, Sn, Te, W, Y, Zn, and Ge.

* * * * *